US00RE47492E

(19) United States
(12) Reissued Patent
Fujii et al.

(10) Patent Number: US RE47,492 E
(45) Date of Reissued Patent: Jul. 9, 2019

(54) BICYCLE CONTROL DEVICE FOR CONTROLLING AN ELECTRIC DEVICE

(71) Applicant: SHIMANO INC., Sakai, Osaka (JP)

(72) Inventors: Kazuhiro Fujii, Sakai (JP); Akinobu Uno, Iwata (JP); Takuro Jinbu, Sakai (JP)

(73) Assignee: SHIMANO INC., Sakai, Osaka (JP)

(21) Appl. No.: 15/393,064

(22) Filed: Dec. 28, 2016

Related U.S. Patent Documents

Reissue of:
(64) Patent No.: 8,931,365
Issued: Jan. 13, 2015
Appl. No.: 13/363,122
Filed: Jan. 31, 2012

(51) Int. Cl.
*B62M 25/08* (2006.01)

(52) U.S. Cl.
CPC ..... *B62M 25/08* (2013.01)

(58) Field of Classification Search
None
See application file for complete search history.

(56) References Cited

U.S. PATENT DOCUMENTS 5,479,776 A * 1/1996 Romano ..... B62K 23/06 192/217
6,015,036 A 1/2000 Fukuda
6,073,730 A 6/2000 Abe
6,142,281 A 11/2000 Campagnolo
6,418,368 B2 7/2002 Jinbo
6,619,154 B2 9/2003 Campagnolo ..... B62M 25/08 74/489
6,698,567 B2 * 3/2004 Dal Pra' ..... B62M 25/04 192/217
7,017,440 B2 * 3/2006 Campagnolo ..... B62M 25/08 74/473.13
7,100,471 B2 * 9/2006 Irie ..... B62K 23/06 192/217
7,703,350 B2 4/2010 Fujii
7,854,180 B2 12/2010 Tetsuka ..... B62K 23/06 74/473.12
9,211,936 B2 * 12/2015 Gao ..... B62L 3/02
9,463,841 B2 * 10/2016 Kawakami ..... B60T 7/102
2001/0053724 A1 12/2001 Campagnolo ..... B62M 25/08 474/80
2003/0019712 A1 1/2003 Dal Pra
2004/0089092 A1 * 5/2004 Campagnolo ..... B62M 25/08 74/502.2

(Continued)

FOREIGN PATENT DOCUMENTS

EP 1739001 A1 * 1/2007 ..... B62M 25/04
FR 2777528 A1 10/1999

*Primary Examiner* — Glenn K Dawson
(74) *Attorney, Agent, or Firm* — Jeffer Mangels; Butler & Mitchell LLP; Brennan C. Swain, Esq.

(57) ABSTRACT

A bicycle control device that includes a bracket configured to be mounted to a handlebar, a first lever pivotally mounted to the bracket and defining a first pivot axis, a second lever that includes a first user contact part pivotally mounted to the first lever that pivots about a second axis, and a first electrical switch mounted to one of the first lever and the second lever. The first electrical switch is operated in response to pivotal movement of the second lever about the second axis. The first pivot axis is positioned between the second pivot axis and the first user contact part.

28 Claims, 5 Drawing Sheets

(56) References Cited

U.S. PATENT DOCUMENTS

| | | | | |
|---|---|---|---|---|
| 2006/0162477 | A1* | 7/2006 | Campagnolo | B62M 25/08 74/473.3 |
| 2010/0186538 | A1 | 7/2010 | Tetsuka | |
| 2011/0185836 | A1* | 8/2011 | Kawakami | B60T 7/102 74/473.13 |

* cited by examiner

BICYCLE CONTROL DEVICE FOR CONTROLLING AN ELECTRIC DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The present invention relates to a bicycle control device. More specifically, the present invention relates to a bicycle control device that is mounted to a handlebar of a bicycle for operating a braking device and for electrically operating an external gear shifting apparatus.

BACKGROUND OF THE INVENTION

There are known bicycle gear shifting devices that are electric powered and configured such that they can be controlled electrically so as to change among a plurality of gear positions. This kind of electric-powered gear shifting device is operated with a gear shifter device that can be mounted to a handlebar (e.g., U.S. Pat. No. 7,854,180 to Tetsuka, the entirety of which is incorporated herein by reference). This conventional gear shifting device electrically operates an external gear shifting apparatus such as a front derailleur and/or a rear derailleur. The conventional gear shifter has a brake lever and two shift levers pivotally mounted to the brake lever. The shift levers are pivoted in an inward direction to operate corresponding switches, respectively.

In the conventional gear shifting device described above, a relatively strong operating force is required for operating the shift lever when the user/rider pushes an upper end portion of a user contact part of the shift lever because the pivot axis of the shift lever is disposed close to the user contact part.

In view of the above, there exists a need for an improved bicycle control device. This invention addresses this need in the art as well as other needs, which will become apparent from this disclosure to those skilled in the art.

SUMMARY OF THE PREFERRED EMBODIMENTS

In accordance with a first aspect of the present invention there is provided a bicycle control device that includes a bracket configured to be mounted to a handlebar, a first lever pivotally mounted to the bracket and defining a first pivot axis, a second lever that includes a first user contact part pivotally mounted to the first lever that pivots about a second axis, and a first electrical switch mounted to one of the first lever and the second lever. The first electrical switch is operated in response to pivotal movement of the second lever about the second axis. The first pivot axis is positioned between the second pivot axis and the first user contact part.

The invention, together with additional features and advantages thereof, may be best understood by reference to the following description.

DETAILED DESCRIPTION OF THE PREFERRED EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
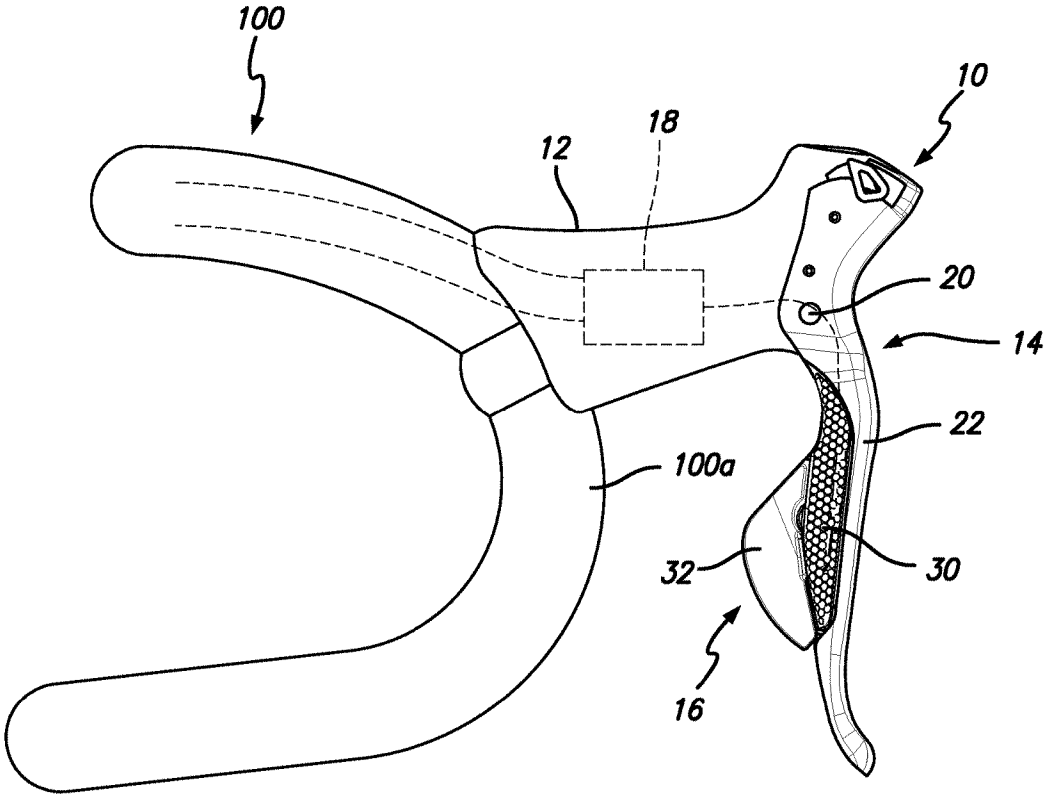
FIG. 1 is a right side elevational view of a bicycle control device in accordance with a preferred embodiment of the present invention.

Referring initially to FIG. 1, a control device 10 is illustrated in accordance with an embodiment of the present invention. The control device is mounted to a handlebar 100. The handlebar 100 is a well-known drop-type handlebar having a right side U-shaped section 100a, a left side U-shaped section (not shown), and an intermediate section (not shown). The intermediate section is disposed between the right side U-shaped section 100a and the left side U-shaped section and connects upper end portion of the right side U-shaped section 100a and the left side U-shaped section. The control device 10 is mounted to the right side U-shaped section 100a for operating a conventional front or rear brake device (not shown) and a conventional electric front or rear derailleur. The control device 10 is connected to the brake device with a Bowden-type brake cable (not shown). The control device 10 is also connected to the electric derailleur with electrical wires (not shown).

In the following explanations, the term "inward" refers to a direction oriented toward the middle of the handlebar 100 from one end or the other of the handlebar 100, and "outward" refers to a direction oriented toward an end of the handlebar 100 from the middle of the handlebar 100.

As shown in FIG. 1, the control device 10 has a bracket 12 configured to be mounted to the handlebar 100, a brake lever 14 that is pivotally mounted to the bracket 12, and a derailleur operating unit 16 that is mounted to the brake lever 14. A connector section 18 is provided inside the bracket 12 for connecting electrical wires.

Figure 3:
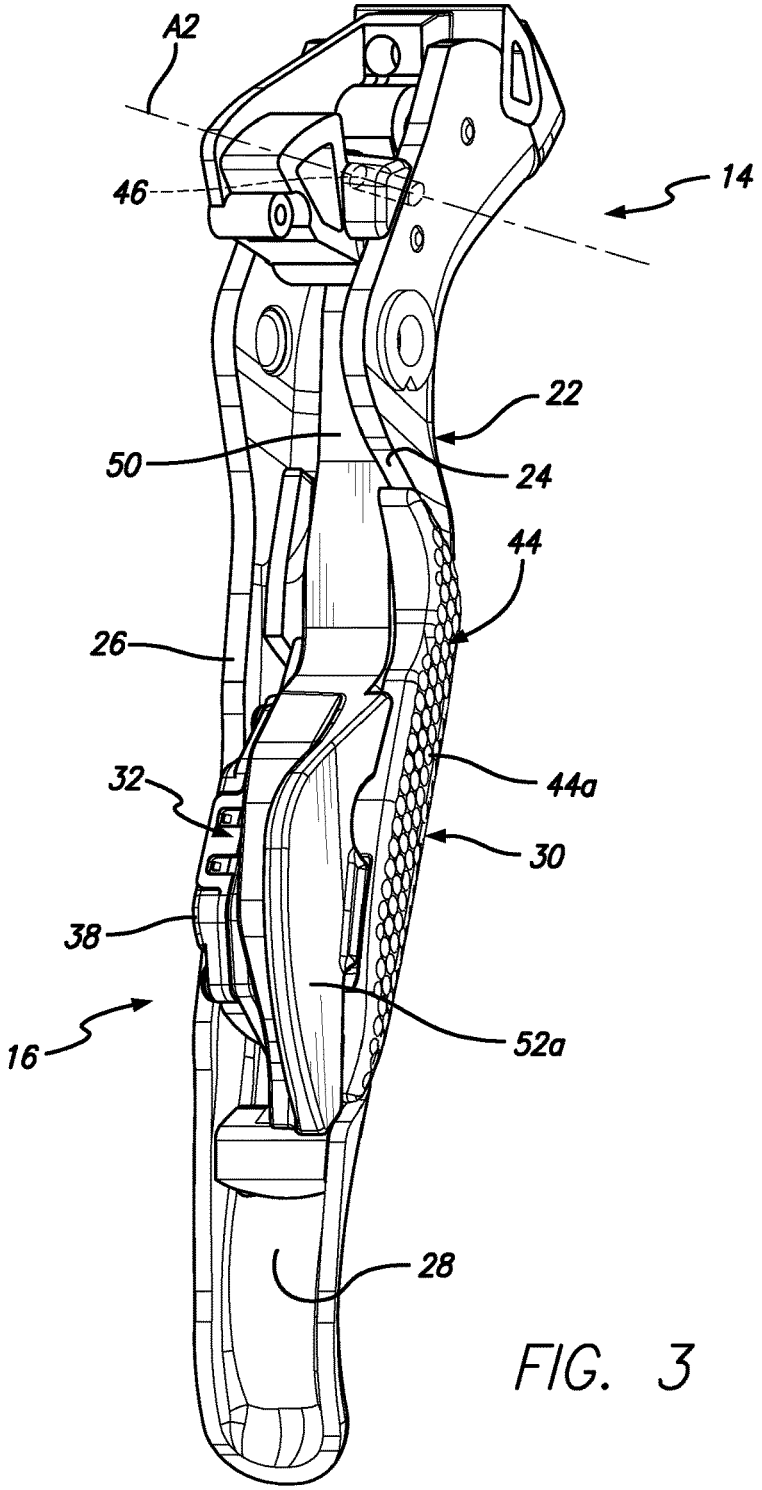
FIG. 3 is a rear perspective view of the derailleur operating unit on the lever operating part of the brake lever.
Figure 4:
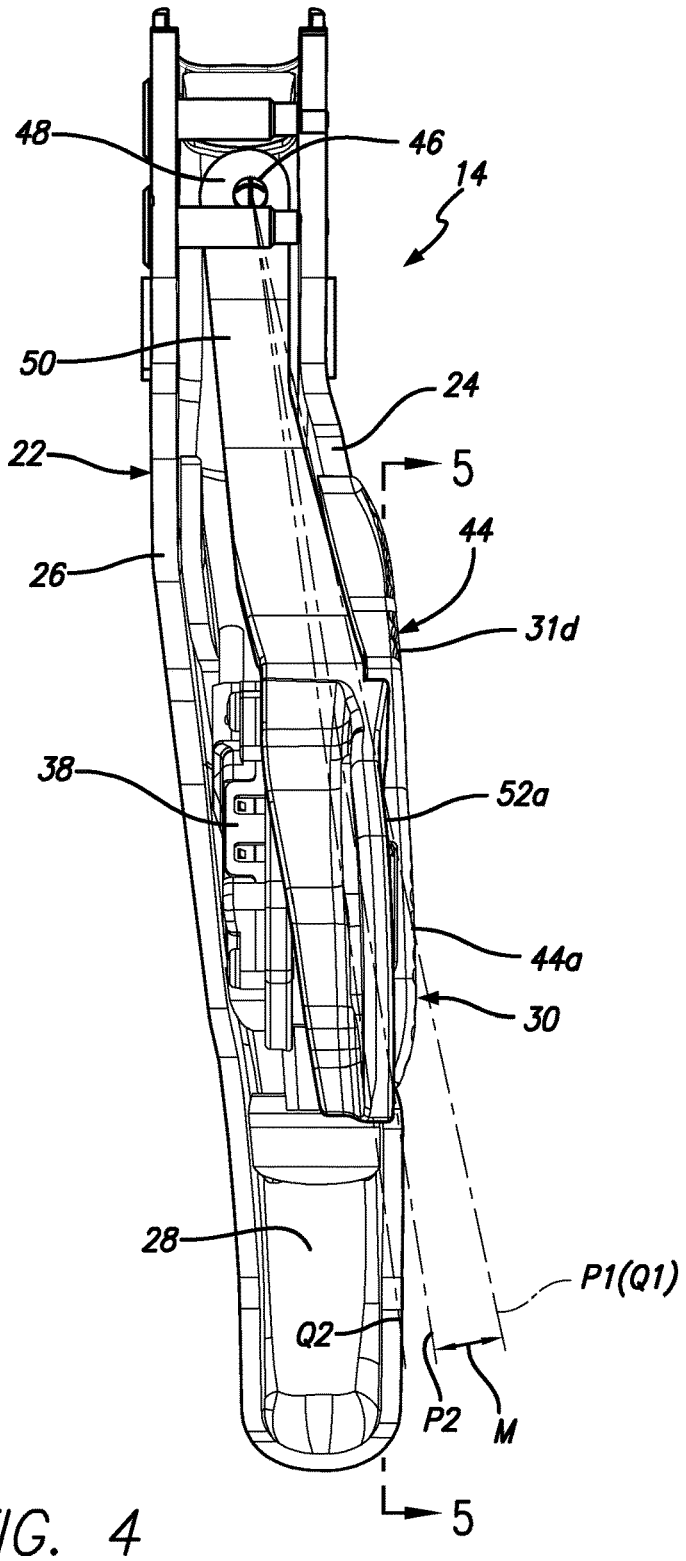
FIG. 4 is a rear elevational view of the derailleur operating unit on the lever operating part of the brake lever.
Figure 5:
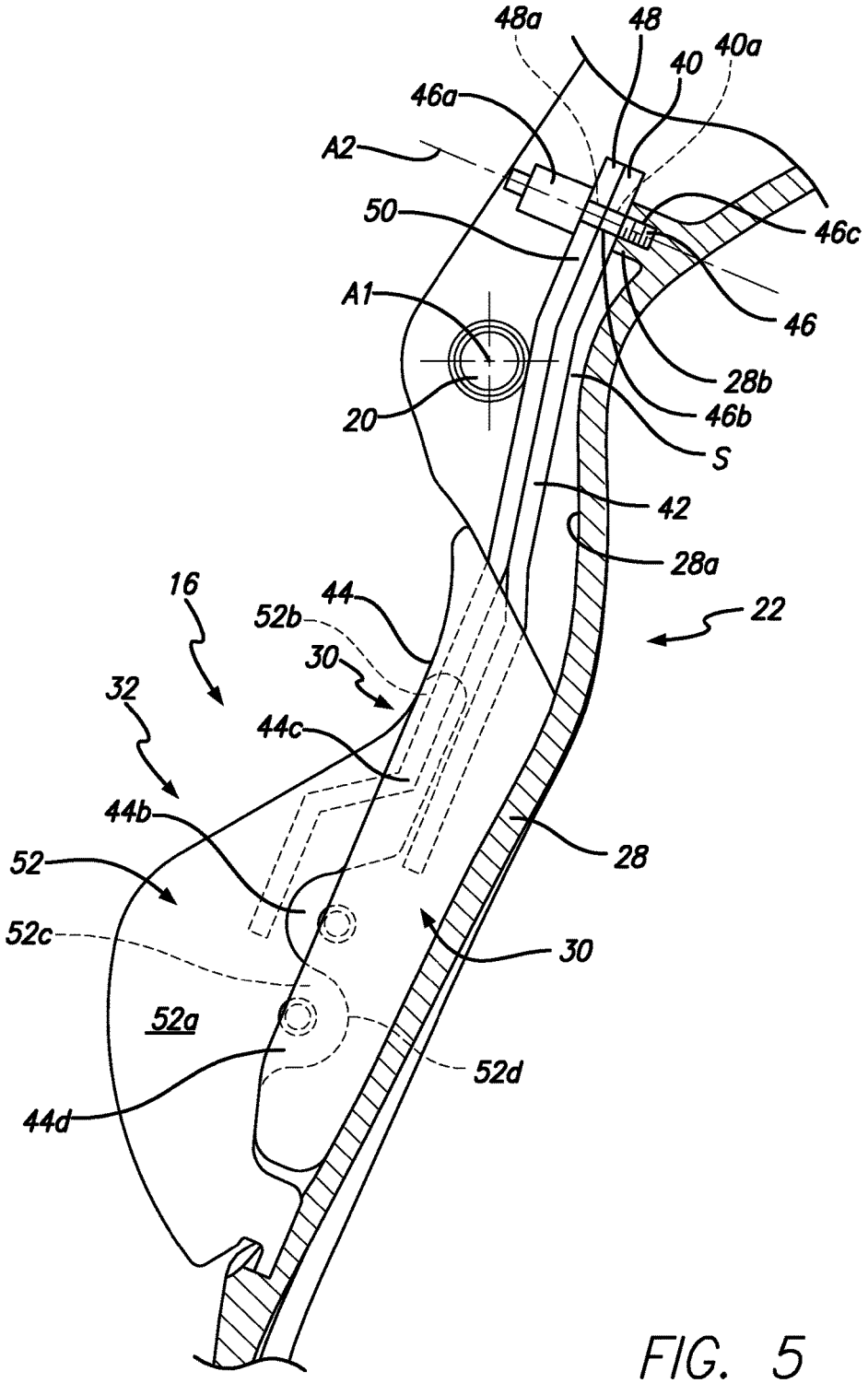
FIG. 5 is a right side cross-sectional view of the derailleur operating unit on the lever operating part of the brake lever.

The brake lever 14 is connected to the bracket 12 such that it can pivot freely about a lever shaft 20 arranged from left to right on a lower frontal portion of the bracket 12. As shown in FIG. 5, the lever shaft 20 defines a brake lever pivot axis A1 about which brake lever 14 pivots. The brake lever 14 is connected to one end of a Bowden-type brake cable (not shown) on the inside of the bracket 12. The other end of the brake cable is connected to the front or rear brake device. The brake lever 14 has a lever operating part 22 that extends downward from a support portion where it is supported by the lever shaft 20. As shown in FIGS. 3 and 4, the lever operating part 22 has a right side wall 24, a left side wall 26, and an intermediate or front wall 28 disposed between the right and left side walls 24 and 26 along the lengthwise dimension of the lever operating part 22. At least a portion of the derailleur operating unit 16 is disposed between the right and left side walls 24 and 26.

Figure 2:
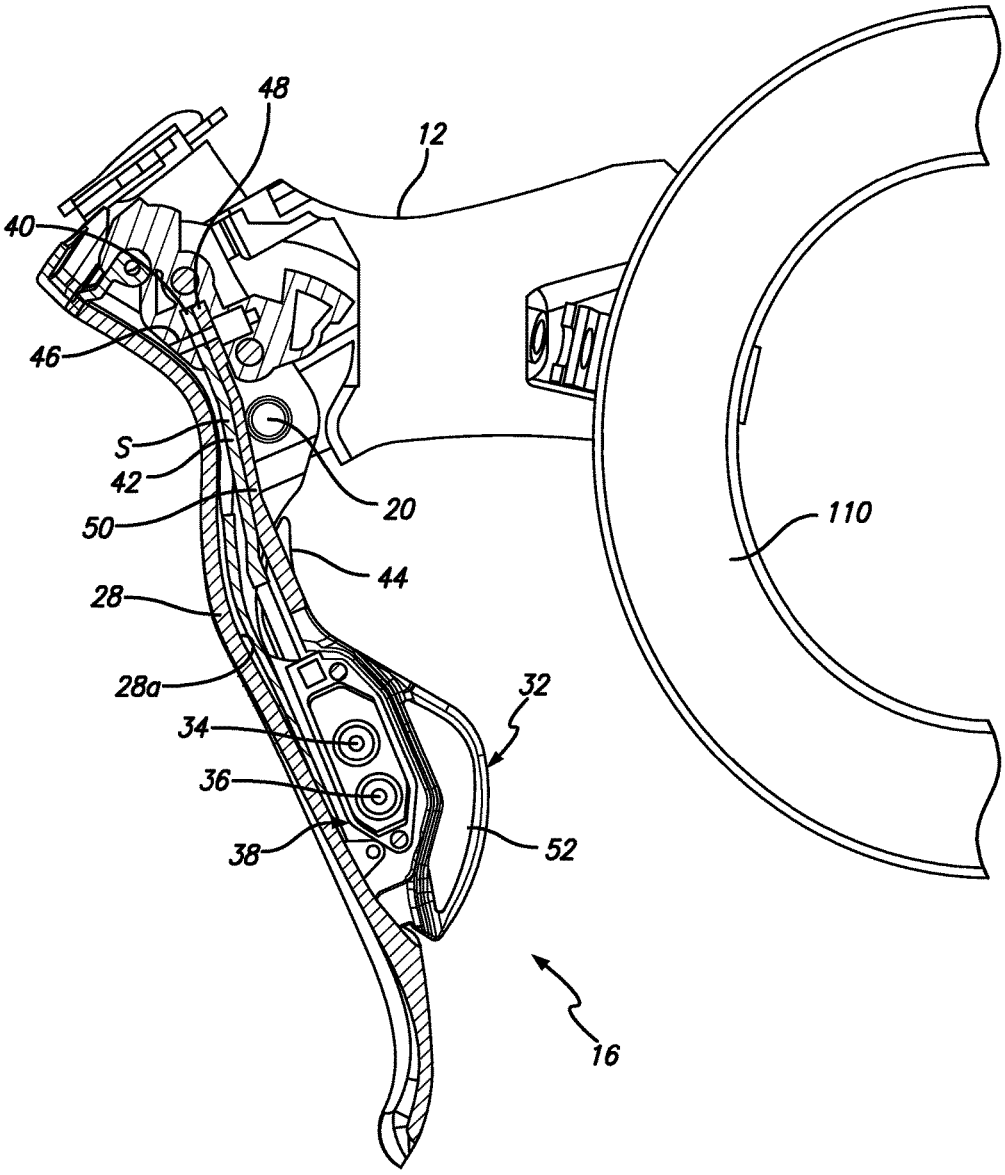
FIG. 2 is a left side cross-sectional view of the bicycle control device.

As shown in FIG. 1, the derailleur operating unit 16 comprises a first shift operating lever 30, a second shift operating lever 32, a first electrical switch 34 and a second electrical switch 36 (see FIG. 2). The first shift operating lever 30 pivots together with the brake lever 14 as the brake lever 14 pivots around axis A1. The first shift operating lever 30 is pivotable relative to the brake lever 14 as mentioned below. The second shift operating lever 32 also pivots together with the brake lever 14 as the brake lever 14 pivots around the axis A1. The second shift operating lever 32 is pivotable relative to the brake lever 14 as mentioned below. The second shift operating lever 32 is separate from the first shift operating lever 30. The first electrical switch 34 is operated with the first shift operating lever 30. The second electrical switch 36 is operated with the second shift operating lever 32. The first and second shift operating levers 30 and 32 are pivotally mounted to a back surface 28a of the front wall 28 of the brake lever 14. The first and second electrical switches 34 and 36 are mounted together in a switch mounting unit 38 on the left side wall 26 of the brake lever 14. In another embodiment, either or both electrical switches 34 and 36 can be mounted on one of the first or second shift operating levers 30 or 32. In this embodiment, the switches 34 or 36 can be actuated by the respective first or second shift operating lever 30 or 32 (or the switch or switch mounting unit) abutting the brake lever after being pivoted.

The first shift operating lever 30 is used to operate the electric derailleur in one of the upshift direction or the downshift direction. As shown in FIG. 4, the first shift operating lever 30 can be pivoted from a first rest position P1 toward the middle of the handlebar 100, i.e., toward the inward side of the brake lever 14 in the direction indicated by the arrow M in FIG. 4. A first operating position P2, where the first electrical switch 34 is actuated, is located on the inward side of the first rest position P1. The first shift operating lever 30 can be pivoted inwardly beyond the first operating position P2.

As shown in FIG. 5, the first shift operating lever 30 has a first mounting part 40, a first arm part 42 and a first user contact part 44. It will be understood that the first shift operating lever 30 is a lever that is mounted on a pivot shaft 46. More particularly, the first mounting part 40 is mounted on pivot shaft 46. The first arm part 42 extends in a radial direction from the first mounting part 40. The first user contact part 44 is arranged to intersect with a distal end portion of the first arm part 42. A first support hole 40a is formed in the first mounting part 40 for the pivot shaft 46 to pass therethrough. The pivot shaft 46 is screwed into a threaded boss part 28b formed on the back surface 28a of the brake lever 14. The pivot shaft 46 has a large diameter flange part 46a, a shaft part 46b and an externally threaded part 46c. The shaft part 46b fits snugly into the first support hole 40a.

As shown in FIG. 4, when the first shift operating lever 30 is in the rest position P1, an extending portion (not shown) of the first user contact part 44 contacts an inward surface of the right side wall 24 of the brake lever 14. Thus, the rest position P1 of the first shift operating lever 30, i.e., the movement endpoint of the first shift operating lever 30 in the outward direction, is determined by this contact.

As shown in FIG. 5, the first user contact part 44 is arranged rearward of the right side wall 24 of the brake lever 14. The first user contact part 44 has a first operating surface 44a that is formed as a rough or tactile surface. A first switch actuating part 44b having a semicircular shape is formed on an opposite surface (inward or leftward side surface) of the first operating surface 44a of the first user contact part 44. A first biasing element (e.g. a coil spring: not shown) is arranged between the first switch actuating part 44b and the first electrical switch 34. According to this construction, the first biasing element pushes the first electrical switch 34 in response to pivotal movement of the first shift operating lever 30 from the first rest position P1 toward the first operating position P2.

As shown in FIG. 5, two pressing parts 44c and 44d configured such that they can press against the second shift operating lever 32 are arranged on both lengthwise sides of the opposite surface. The pressing parts 44c and 44d are formed thinner than other portions and are arranged and configured such that the second shift operating lever 32 enters into the inside thereof.

The second shift operating lever 32 is used to operate the electric derailleur in the other of the upshift direction or the downshift direction. As shown in FIG. 4, the second shift operating lever 32 can be pivoted from a second rest position Q1 toward the middle of the handlebar 100, i.e., toward the inward side of the brake lever 14. A second operating position Q2 where the second electrical switch 36 is actuated is located on the inward side of the second rest position Q1. The second shift operating lever 32 can be pivoted inwardly beyond the second operating position Q2. The movement distance from the first rest position P1 to the first operating position P2 is shorter than the distance from the second rest position Q1 to the second operating position Q2.

When the first shift operating lever 30 is moved inward or leftward relative to the brake lever 14, the second shift operating lever 32 moves inward or leftward relative to the brake lever 14 together with the first shift operating lever 30. Conversely, when the second shift operating lever 32 is moved inward relative to the brake lever 14, the first shift operating lever 30 does not move inward. Since the movement distance of the first shift operating lever 30 is shorter than the movement distance of the second shift operating lever 32, the second electrical switch 36 is not actuated when the second shift operating lever 32 moves inward as a result of the first shift operating lever 30 being operated.

The second shift operating lever 32 has a second mounting part 48, a second arm part 50 and a second user contact part 52. It will be understood that the second shift operating lever 32 is a lever that is mounted on pivot shaft 46. More particularly, the second mounting part 48 is supported or mounted on the pivot shaft 46. The second arm part 50 extends in a radial direction from the second mounting part 48. The second user contact part 52 is arranged to intersect with a distal end portion of the second arm part 50.

A second support hole 48a is formed in the second mounting part 48 for the pivot shaft 46 to pass there-through. The shaft part 46b of the pivot shaft 46 fits snugly into the support hole 48a. Since the first shift operating lever 30 and the second shift operating lever 32 are both pivotally mounted to the same pivot shaft 46, both members pivot about the same (single) axis A2 (see FIG. 5).

As is shown in FIG. 5, axis A1 is positioned between the shift lever pivot axis A2 (the axis about which the first shift operating lever 30 and the second shift operating lever 32 pivot) and the first user contact part 44. Axis A1 is also positioned between axis A2 and the second user contact part 52. In other words, when the bicycle control device 10 is mounted on the handlebar 100, the pivot axis of the first shift operating lever 30 and the pivot axis of the second shift operating lever 32 (which is the same in FIG. 5) is positioned above the pivot axis of the brake lever 14 and the uppermost point of the first user contact part 44 and the uppermost point of the second user contact point 52 is positioned below the pivot axis of the brake lever 14. In a preferred embodiment, axes A1 and A2 are non-parallel and are preferably approximately perpendicular to one another.

Pressure receiving parts 52b and 52c are provided on an upper end portion and an intermediate portion, respectively, along the lengthwise direction of the second user contact part 52. The pressure receiving parts 52b and 52c are provided in positions where they can contact the pressing parts 44c and 44d of the first user contact part 44. The pressure receiving parts 52b and 52c are contacted and pressed by the pressing parts 44c and 44d when the first shift operating lever 30 is pivoted from the first rest position P1. As a result, the second shift operating lever 32 is pivoted in unison when the first shift operating lever 30 is pivoted.

A second switch actuating part 52d having a semicircular shape is formed on an opposite surface (inward or leftward side surface) of the second operating surface 52a of the second user contact part 52. A second biasing element (e.g. a coil spring: not shown) is arranged between the second switch actuating part 52d and the second electrical switch 36. According to this construction, the second biasing element pushes the second electrical switch 36 in response to pivotal movement of the second shift operating lever 32 from the second rest position Q1 toward the first operating position Q2.

As shown in FIG. 4, the second arm part 50 is positioned adjacent the first arm part 42 (not shown in FIG. 4) when the second shift operating lever 32 is in the second rest position Q1. Thus, the second rest position Q1 is the movement end-point of the second shift operating lever 32 in the outward direction. The second arm part 50 extends in a radial direction from the second mounting part 48 in a position rearward of the first arm part 42.

As shown in FIGS. 3-5, a portion of the second user contact part 52 is arranged rearward of the first user contact part 44. A second operating surface 52a is formed on an outward or rightward face of the second user contact part 52. The second operating surface 52a is a smooth surface without roughness or bumpiness such that it can be distinguished from the first operating surface 44a by the sense of touch (difference in texture). When the shift operating levers 30 and 32 are both in the rest position P1 and Q1, the second operating surface 52a is arranged in a different plane than the first operating surface 44a (FIG. 4). More specifically, the second operating surface 52a is arranged slightly further inward or leftward than the first operating surface 44a. Thus, the first shift operating lever 30 and the second shift operating lever 32 can be distinguished based on both the difference in texture and the difference in arrangement, enabling unintended gear shift operations to be prevented in a reliable fashion.

In this embodiment, the brake lever 14 corresponds to the first lever, the first shift operating lever 30 corresponds to the second lever, the second shift operating lever 32 corresponds to the third lever, the axis A1 corresponds to the first pivot axis, and the axis A2 corresponds to the second and third pivot axes. According to this construction, a rider can operate the first shift operating lever 30 and the second shift operating lever 32 with relatively little effort even though he or she pushes the upper end portions of the first shift operating lever 30 and the second shift operating lever 32.

In a preferred embodiment, a space S is defined between the axis A1 (or the lever shaft 20) and the back surface 28a of the front wall 28 of the brake lever 14. As shown in FIG. 5, the first arm part 42 and the second arm part 50 extend through this space S. The first arm part 42 and the second arm part 50 are therefore positioned between the axis A1 and the back surface 28a of the front wall 28. This positioning provides reduced exposure of at least one of (and preferably both) of the first arm part 42 and the second arm part 50. This positioning provides an attractive appearance and/or helps prevent undesirable contact of a rider's or user's hand with the first arm part 42 and the second arm part 50. Further, with such an arrangement in which the first arm part 42 and the second arm part 50 are positioned between the axis A1 and the back surface 28a of the front wall 28, it is possible to effectively limit the pivot ranges of the first arm part 42 and the second arm part 50 by the side walls 24 and 26 of the brake lever 14 without providing separate pivot-range limit structure.

Although the preceding embodiment presents a derailleur (externally mounted gear changer) as an example of a gear changer device, the present invention can also be applied to a brake and gear changer operating device configured to operate an internally installed gear changer device that has a plurality of indexing positions and can be electrically controlled.

Although in the preceding embodiment the first shift operating lever 30 and the second shift operating lever 32 are connected to the brake lever 14 such that they pivot about the same pivot shaft 46, it is acceptable to connect them such that they pivot about separate pivot shafts and, therefore, axes. It is also acceptable to connect the shift operating lever 30 and 32 to the brake lever 14 such that they move in a fashion other than a pivoting fashion, e.g., a sliding fashion.

In the preceding embodiment, the first and second shift operating levers 30 and 32 are mounted directly to the brake lever 14. However, it is acceptable for the first and second shift operating levers 30 and 32 to be mounted to either the brake lever 14 or the bracket 12 with a separate mounting member.

Although in the preceding embodiment the movement distances of the two shift operating levers are different in order to prevent unintended operations, it is acceptable for both movement distances to be the same.

It will be understood that the present invention can be applied to a bicycle control device that inputs a signal that indicates a single shift movement to a shifting device with a single shift operation and also to a bicycle control device that inputs a signal that indicates two or more shift movements to a shifting device with a single shift operation.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. Also, the terms "part," "section," "portion," "member" or "element" when used in the singular can have the dual meaning of a single part or a plurality of parts. As used herein to describe the above embodiment(s), the following directional terms "forward," "rearward," "rightward," "leftward," "outward," "forward," "inward," "downward," "upward," "above," "below," "vertical," "horizontal," and "transverse" as well as any other similar directional terms refer to those directions of a bicycle equipped with the bicycle control device. Accordingly, these terms, as utilized to describe the bicycle control device should be interpreted relative to a bicycle equipped with the bicycle control device as used in the normal riding position on a level surface. Finally, terms of degree such as "substantially," "about" and "approximately" as used herein mean a reasonable amount of deviation of the modified term such that the end result is not significantly changed.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, 116, other aspects may likewise be embodied as a means-plus-function claim, or in other forms, such as being embodied in a computer-readable medium. (Any claims intended to be treated under 35 U.S.C. §112, ¶6 will begin with the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A bicycle control device comprising:

a bracket configured to be mounted to a handlebar;

a first lever for braking pivotally mounted to the bracket and defining a first pivot axis;

a second lever for shifting pivotally mounted to the first lever to pivot about a second axis, wherein the second lever includes a first user contact part;

a first electrical switch mounted to one of the first lever and the second lever and operated in response to pivotal movement of the second lever about the second axis, wherein the first pivot axis is positioned between the second axis and the first user contact part;

a third lever for shifting pivotally mounted to the first lever to pivot about a third axis, wherein the third lever includes a second user contact part; and a second electrical switch mounted to one of the first lever, second lever, and the third lever and operated in response to pivotal movement of the third lever about the third axis, wherein the first pivot axis is positioned between the second axis and the second user contact part.

2. The bicycle control device of claim 1 wherein the second axis is [non] *not* parallel to the first pivot axis.

3. The bicycle control device of claim 1 wherein the first electrical switch is mounted to the first lever.

4. The bicycle control device of claim 1 wherein the second and third axes are [non] *not* parallel to the first pivot axis.

5. The bicycle control device of claim 1 wherein the first and second electrical switches are mounted to the first lever.

6. The bicycle control device of claim 1 wherein the second axis and the third axis are co-axial.

7. The bicycle control device of claim 1 wherein the second lever is pivoted relative to the first lever in a first direction to operate the first switch and the third lever is pivoted relative to the first lever in a second direction to operate the second switch, wherein the first and second directions extend parallel to one another.

8. The bicycle control device of claim 1 wherein the third lever is arranged such that the third lever is pivoted by the second lever when the second lever is pivoted about the second pivot axis relative to the first lever.

9. The bicycle control device of claim 1 wherein the first lever includes a front wall having a back surface, wherein the second lever is positioned between the first pivot axis and the back surface.

10. The bicycle control device of claim 1 wherein the first lever includes a front wall having a back surface, wherein the second lever and the third lever are positioned between the first pivot axis and the back surface.

11. The bicycle control device of claim 1 *wherein the first pivot axis lies in a first plane and the second axis lies in a second plane, and* wherein the second [axis] *plane* is approximately perpendicular to the first [pivot axis] *plane*.

12. The bicycle control device of claim 1 *wherein the first pivot axis lies in a first plane, the second axis lies in a second plane and the third axis lies in a third plane, and* wherein the second and third [axes] *planes* are approximately perpendicular to the first [pivot axis] *plane*.

13. A bicycle control device comprising:

a bracket configured to be mounted to a handlebar;

a first lever pivotally mounted to the bracket and defining a first pivot axis, the first lever including a front wall having a back surface;

a second lever pivotally mounted to the first lever to pivot about a second pivot axis, wherein the second lever includes a first user contact part; and a first electrical switch being operated in response to pivotal movement of the second lever about the second pivot axis, wherein the first pivot axis is positioned between the second pivot axis and the first user contact part;

a third lever pivotally mounted to the first lever to pivot about a third pivot axis, wherein the third lever includes a second user contact part; and a second electrical switch being operated in response to pivotal movement of the third lever about the third pivot axis, wherein the first pivot axis is positioned between the second pivot axis and the second user contact part, and wherein the second lever is positioned between the first pivot axis and the back surface.

14. The bicycle control device of claim 13 wherein the third lever is positioned between the first pivot axis and the back surface.

15. A bicycle control device comprising:

a bracket configured to be mounted to a handlebar;

a brake lever pivotally mounted to the bracket and defining a first pivot axis, the brake lever including a front wall having a back surface;

a first shift lever pivotally mounted to the brake lever to pivot about a second axis, wherein the first shift lever includes a first user contact part;

a second shift lever pivotally mounted to the brake lever to pivot about the second axis, wherein the second shift lever includes a second user contact part, and wherein the second shift lever is pivoted when the first shift lever is pivoted about the second pivot axis relative to the [first] *brake* lever;

a first electrical switch being operated in response to pivotal movement of the first shift lever about the second axis, and a second electrical switch being operated in response to pivotal movement of the second shift lever about the second axis;

*wherein the first pivot axis lies in a first plane and the second axis lies in a second plane,* wherein the second [axis] *plane* is approximately perpendicular to the first [pivot axis] *plane*, wherein the first pivot axis is positioned between the second pivot axis and the first and second user contact parts, and wherein the first and second shift levers are positioned between the first pivot axis and the back surface of the front wall of the brake lever.

16. The bicycle control device of claim 15 wherein the first and second electrical switches are mounted to the brake lever.

*17. A bicycle control device comprising:*

*a bracket configured to be mounted to a handlebar;*

*a first lever pivotally mounted to the bracket and defining a first pivot axis;*

*a second lever pivotally mounted to the first lever to pivot about a second axis, wherein the second lever includes a first user contact part;*

*a first electrical switch mounted to one of the first lever and the second lever and operated in response to pivotal movement of the second lever about the second axis; and*

*a second electrical switch mounted to either the first lever or the second lever;*

*wherein the first pivot axis is positioned between the second pivot axis and the first user contact part,*

*wherein the first lever includes a front wall having a back surface, and*

*wherein the second lever is positioned between the first pivot axis and the back surface.*

*18. The bicycle control device of claim 17 wherein the first electrical switch is mounted to the second lever.*

*19. The bicycle control device of claim 18 wherein the second electrical switch is mounted to the second lever.*

*20. The bicycle control device of claim 19 wherein the first pivot axis is positioned between the second axis and the first and second electrical switches.*

*21. A method of using a bicycle control device, the method comprising the steps of:*

*obtaining the bicycle control device, wherein the bicycle control device comprises a bracket configured to be mounted to a handlebar and at least first and second levers, wherein the first lever is pivotally mounted to the bracket and defines a first pivot axis, wherein the second lever is pivotally mounted to the first lever to pivot about a second axis, wherein the second lever includes a first user contact part, wherein the bicycle control device includes a first electrical switch mounted to one of the first lever and the second lever, wherein the first electrical switch is operated in response to pivotal movement of the second lever about the second axis, and wherein the bicycle control device includes a second electrical switch mounted to either the first lever or the second lever, wherein the first pivot axis is positioned between the second pivot axis and the first user contact part, wherein the first lever includes a front wall having a back surface, and wherein the second lever is positioned between the first pivot axis and the back surface;*

*contacting the first user contact part; and*

*pivoting the second lever about the second axis to operate the first electrical switch.*

*22. The method of claim 21 wherein the first electrical switch is mounted to the second lever.*

*23. The method of claim 22 wherein the second electrical switch is mounted to the second lever.*

*24. The method of claim 23 wherein the first pivot axis is positioned between the second axis and the first and second electrical switches.*

*25. A method of making a bicycle control device, the method comprising the steps of:*

*obtaining a bracket that is configured to be mounted to a handlebar;*

*mounting a first lever to the bracket, wherein the first lever is pivotal about a first pivot axis and includes a front wall having a back surface;*

*mounting a second lever to the first lever such that it is positioned between the first pivot axis and the back surface, wherein the second lever is pivotal about a second axis, and wherein the second lever includes a first user contact part, wherein the first pivot axis is positioned between the second pivot axis and the first user contact part;*

*mounting a first electrical switch to either the first lever or the second lever, wherein the first electrical switch is operated in response to pivotal movement of the second lever about the second axis; and*

*mounting a second electrical switch to either the first lever or the second lever.*

*26. The method of claim 25 wherein the first electrical switch is mounted to the second lever.*

*27. The method of claim 26 wherein the second electrical switch is mounted to the second lever.*

*28. The method of claim 27 wherein the first pivot axis is positioned between the second axis and the first and second electrical switches.*

* * * * *